United States Patent
Kapur et al.

(10) Patent No.: US 7,509,568 B2
(45) Date of Patent: Mar. 24, 2009

(54) ERROR TYPE IDENTIFICATION CIRCUIT FOR IDENTIFYING DIFFERENT TYPES OF ERRORS IN COMMUNICATIONS DEVICES

(75) Inventors: Mohit Kapur, Mount Kisco, NY (US); Jose A. Tierno, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 11/033,077

(22) Filed: Jan. 11, 2005

(65) Prior Publication Data

US 2006/0156215 A1    Jul. 13, 2006

(51) Int. Cl.
G06F 11/00    (2006.01)
(52) U.S. Cl. ...................................................... 714/799
(58) Field of Classification Search ................... 714/799
See application file for complete search history.

(56) References Cited

U.S. PATENT DOCUMENTS

| | | | |
|---|---|---|---|
| 3,648,237 A | 3/1972 | Frey, Jr. et al. ............ | 340/146.1 |
| 3,694,757 A | 9/1972 | Hanna, Jr. ................... | 325/466 |
| 3,742,449 A | 6/1973 | Blair ................. | 340/146.1 AL |
| 3,755,779 A | 8/1973 | Price .................. | 340/146.1 AL |
| 3,775,746 A | 11/1973 | Boudreau et al. ... | 340/146.1 AL |
| 4,771,463 A | 9/1988 | Beeman ........................ | 380/46 |
| 5,140,595 A | 8/1992 | Geldman et al. ........... | 371/39.1 |
| 5,181,207 A | 1/1993 | Chapman ................... | 371/37.4 |
| 5,283,831 A | 2/1994 | Cook et al. .................... | 380/48 |
| 5,321,754 A | 6/1994 | Fisher et al. .................. | 380/48 |
| 5,954,839 A | 9/1999 | Park et al. .................... | 714/825 |
| 6,856,600 B1 * | 2/2005 | Russell et al. ............... | 370/244 |

* cited by examiner

*Primary Examiner*—Jacques H Louis-Jacques
*Assistant Examiner*—Sam Rizk
(74) *Attorney, Agent, or Firm*—Yee & Associates, P.C.; Anne Dougherty

(57) ABSTRACT

An apparatus, method, and computer program product to identify types of errors that occur in a communications device under test and where only the presence of an error is indicated by an error checker. Each presence of an error bit in an error signal during a first period of time output from the error data checker is identified. The error bit indicates only that a mismatch occurred between an input signal input into the device and an output signal output from the device. The error bit is generated in response to an error in the device under test. The error bit includes no information about a type of the error. The type of the error is determined by determining a number of occurrences of the error bit in the error signal during the first period of time.

14 Claims, 5 Drawing Sheets

ERROR TYPE IDENTIFICATION CIRCUIT FOR IDENTIFYING DIFFERENT TYPES OF ERRORS IN COMMUNICATIONS DEVICES

BACKGROUND OF THE INVENTION

1. Technical Field

The present invention is directed to data processing systems and particularly to communications systems. More specifically, the present invention is directed to a method, apparatus, and computer program product for identifying different types of errors that occur in a communications device under test (DUT) where only the presence of an error is indicated by an error checker.

2. Description of Related Art

The ongoing development of communication circuits and channels for the synchronous transport module (STM), the 10 Gigabit Ethernet (IEEE 802.3ae) application, and several other applications require the use of data generators and checkers to test communication circuits and/or channels. The data generated by the data generator that is used to test a device can be a Pseudo Random Bit Stream (PRBS) or can adhere to another format as dictated by another standard.

These checkers are error detection circuits that indicate only the presence of an error but do not provide any information regarding the type of error that occurred. These checkers output an error signal. When a checker detects an error, it merely indicates the occurrence, or presence, of an error by outputting a pulse (or error bit) in the error signal each time an error occurs. For a given clock cycle, the presence of an error bit in the error signal indicates that an error occurred in the device under test.

The error bit is generated by a checker. The error bit represents a mismatch between the input to the device under test and the output the checker expected to receive from the device. Thus, these checkers indicate the occurrence of an error but provide no other information about the error. For example, these checkers do not identify whether the error was an isolated event, a burst event, or a long term or severe event.

A typical PRBS checker includes a synchronization detector, a local PRBS generator, and a comparator circuit. The synchronization detector looks for a known pattern in the incoming stream. Once the detector detects the known pattern, the detector turns on the local PRBS generator. The local generator and the generator at the input of DUT are designed to be identical. After synchronization is achieved, the two generators are expected to produce identical bit streams. The comparator circuit detects any mismatches caused due to the DUT. The PRBS checker generates an error signal. When a mismatch occurs, the PRBS checker includes a pulse in the error signal to indicate that an error occurred. As is obvious from this description, the error signal provides no information about the type of error. The error signal indicates only the occurrence of an error.

Although error counters and error rate measurement circuits are available, they do not help in identifying the type of error that occurred. These counters and circuits indicate merely the presence of an error, i.e. an indication that some type of error occurred, and not what type of error it was. Error type information is very useful in finding out the source of error. For example, in a communication receiver which uses a clock data recovery phase locked loop (PLL), a long term error is caused when the PLL falls out of synchronization. With a conventional error counter in a system where the PLL falls out of synchronization, the error counter will indicate only a very high error count. However, nothing in the error counter or the output of the error counter will indicate which type of error caused the high error count.

Another example is a communication receiver which uses a decision feedback equalizer (DFE). The DFE circuit by design converts single bit errors into burst errors. Again, in this case, the conventional error counter only indicates a high error count. The conventional error counter does not indicate whether the high error count is due to a long term error or multiple bursts of errors. Nothing in the error counter or output of the error counter will indicate which type of error caused the high error count.

Therefore, a need exists for a method, system, and computer program product for identifying types of errors that occur in a communications device under test and where only the presence of an error is indicated by an error checker.

SUMMARY OF THE INVENTION

An apparatus, method, and computer program product are disclosed for identifying types of errors that occur in a communications device under test and where only the presence of an error is indicated by an error checker. Each presence of an error bit in an error signal during a first period of time output from the error data checker is identified. The error bit indicates only that a mismatch occurred between an input signal input into the device and an output signal output from the device. The error bit is generated in response to an error in the device under test. The error bit includes no information about a type of the error. The type of the error is determined by determining a number of occurrences of the error bit in the error signal during the first period of time.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

Noise injected errors are generally isolated single shot events or a small burst of errors occurring in a short duration of time. This property of these types of errors can be used to identify burst errors.

Continuous long streams of errors are caused by loss of signal on communication lines or dying circuits. This property could be used to declare a loss of synchronization of the data checker.

This loss of synchronization signal due to long term errors can be used to activate backup circuits or redundant circuits which replace faulty circuits automatically. Once the backup circuit replaces the dying circuit, the error sorter again starts recognizing error behavior without external intervention.

The present invention is an error sorting circuit. A Start Sorter signal is received in the circuit. The Start Sorter signal can be a system level input or can be generated from a PLL lock signal in a clock data recovery system. Once the Start Sorter signal transitions to an active state, the error sorting circuit looks at an error signal that is output from the data checker. If there are no errors indicated by the error signal for a programmable length of time "P", the circuit declares that the checker is in synchronization with the data generator. At this time, any old data has been purged from the data checker and the error sorting circuit is ready to begin determining types of errors.

After synchronization is declared, the error sorting circuit receives the error signal from the data checker. On encountering an error, the circuit waits for a programmable length of time CP. During time CP, the circuit continues counting additional errors from the data checker. If the count remains at one, the error is identified as being a single shot or isolated type of error. If the count is greater than one but less than a user settable threshold of T, the errors are identified as being a burst error type of error. If the number of errors exceeds the threshold T, the circuit identifies the errors as being a long term error. The circuit indicates a loss of synchronization. The circuit then waits for the Start Sorter signal to become active again.

Figure 1:
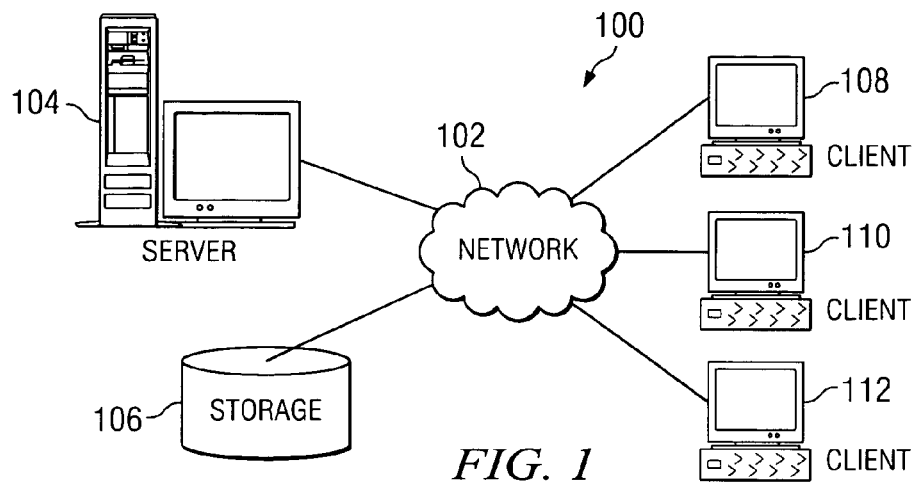
FIG. 1 is a pictorial representation which depicts a network of data processing systems in accordance with the present invention.

Before describing the present invention in detail, a description of a data processing environment that may include the present invention is described with reference to FIGS. 1 and 2. FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers, network computers, or other computing devices. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 100 also may be implemented as a number of different types of networks, such as for example, an intranet, a local area network (LAN), a wide area network (WAN), or a wireless network. FIG. 1 is intended as an example, and not as an architectural limitation for the present invention.

Figure 2:
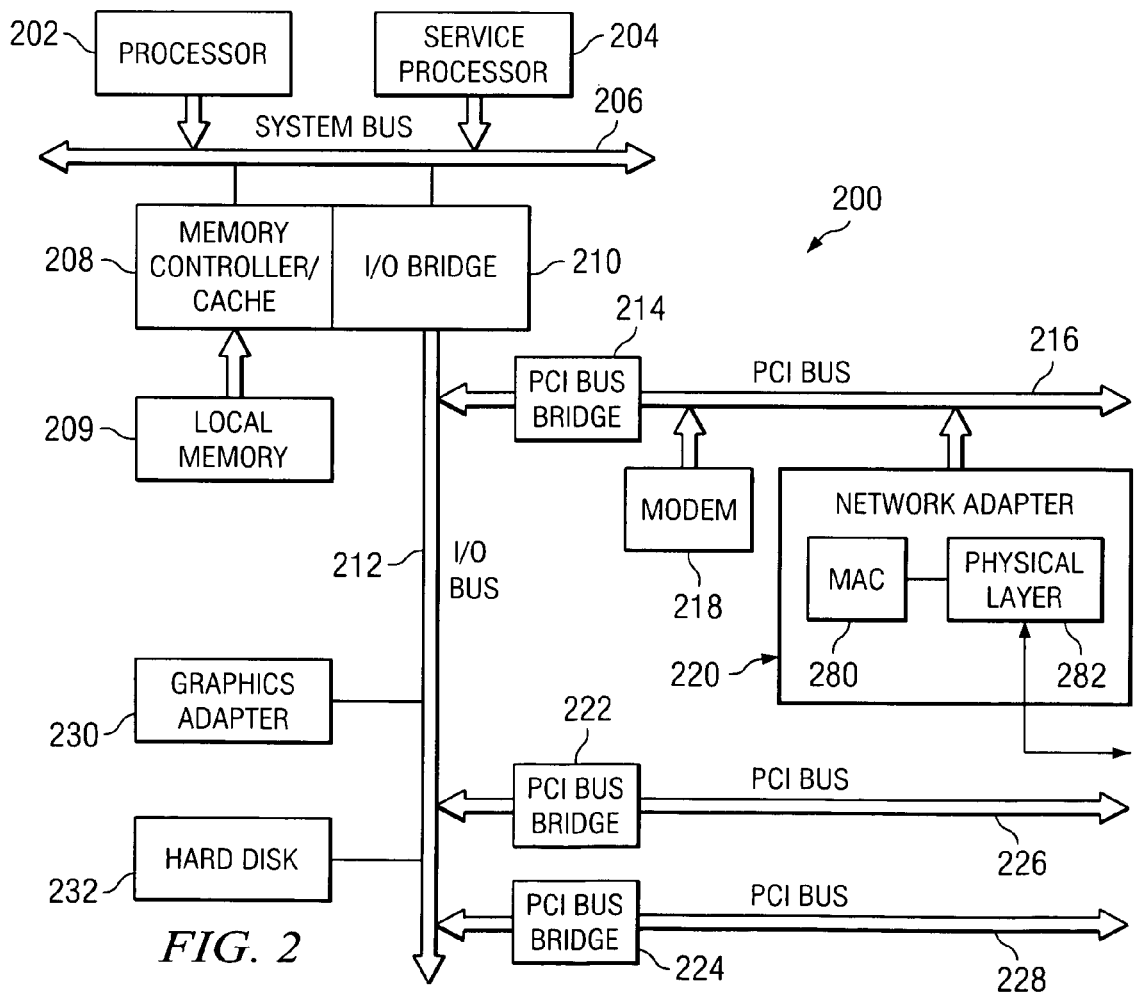
FIG. 2 is a more detailed illustration of a computer system that may be used to implement any of the computer systems of FIG. 1 in accordance with the present invention.

FIG. 2 is a more detailed illustration of a computer system that may be used to implement any of the computer systems of FIG. 1 in accordance with the present invention. Data processing system 200 may be a symmetric multiprocessor (SMP) system including a plurality of processors 202 and 204 connected to system bus 206. Alternatively, a single processor system may be employed. In the depicted example, processor 204 is a service processor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example an Ethernet network over an RJ45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Figure 3:
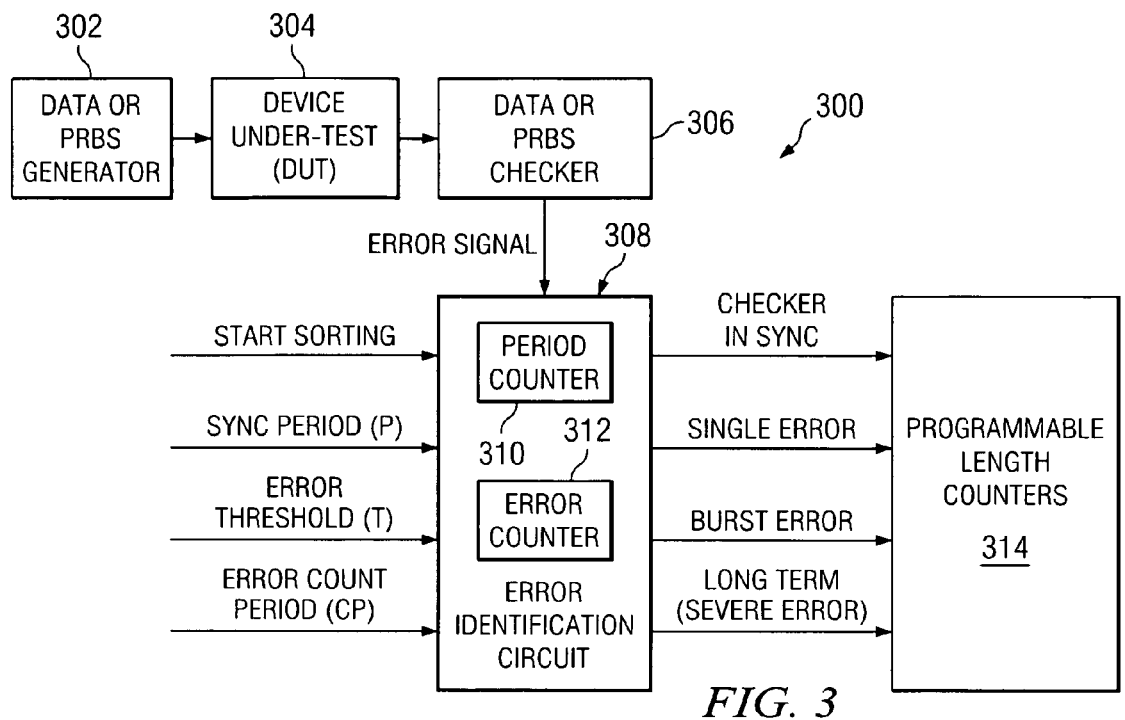
FIG. 3 is a block diagram of a test system used to test communication devices such as networks, channels, and/or devices in accordance with the present invention.

FIG. 3 depicts a block diagram of a test system used to test devices such as communication circuits and channels in accordance with the present invention. Test system 300 includes a data generator 302, such as a PRBS generator, a device under test (DUT) 304, a data checker 306 such as a PRBS checker, an error identification circuit 308, and programmable length counters 314. Although the following discussion describes a PRBS generator and PRBS checker, those skilled in the art will recognize that other formats may be used.

Data generator 302 may be included in a first computer system that is transmitting data via a communication network, channel, or device to a second computer system. The second computer system may include data checker 306. In this example, the communication device, such as a network, that is used to couple the two computer systems together is considered to be the device-under-test 304.

PRBS generator 302 feeds DUT 304 a random bit sequence of a desired length. DUT 304 can be, by way of example only, a communication channel under test/characterization or a communication circuit such as a high speed serializer-deserializer. Of course, the DUT 304 can be any device that can be tested in a binary system. The output of DUT 304 is also a PRBS stream. The output stream is then fed to PRBS checker 306. PRBS checker 306 checks the bits for correctness.

Error identification circuit 308 includes two counters: period counter 310 and error counter 312. Period counter 310 keeps track of the period and error counter 312 counts the number of error pulses in the error signal output from PRBS checker 306.

A Start Sorting signal, a Sync Period value (P), an Error Threshold value (T), and an Error Count Period (CP) are input into error identification circuit 308. An Error Signal that is output from Data Checker 306 is also input into error identification circuit 308. The Error Signal output from Data Checker 306 is the prior art error signal described above that includes a pulse each time a mismatch is detected by Data Checker 306. The Error Signal does not include any information about the type of error that occurred that caused a pulse in the Error Signal.

Error identification circuit 308 operates as described below to count the number of error pulses that are included in the Error Signal that is output from Data Checker 306. When error identification circuit 308 receives a Start Sorting signal, Period Counter 310 begins counting the number of clock periods. Error identification circuit 308 has received a Sync Period value (P) that indicates the number of clock periods that must pass after the Start Sorting signal is received with no errors indicated by the Error Signal from checker 306. After the Start Sorting signal is received, error counter 312 begins counting the number of error pulses in the checker's Error Signal. If the Sync Period (P) number of clock periods passes with no errors detected in the Error Signal, error identification circuit determines that the synchronization has occurred among data generator 302 and data checker 306. Error identification circuit 308 then generates a Checker in Sync signal. At this time the Checker in Sync signal is asserted.

Once the Checker in Sync signal is generated, Error Counter 312 and Period Counter 310 are reset to start counting again. Period Counter 310 again counts the number of periods to identify each Error Count Period (CP). Error Counter 312 counts the number of error pulses that occur in the checker's Error Signal during each Error Count Period (CP). If the number of errors pulses that occur during an Error Count Period (CP) is equal to one, error identification circuit 308 determines that a single, also called isolated, error occurred and generates a Single Error Signal. If the number of errors pulses that occur during an Error Count Period (CP) is greater than one and less than an Error Threshold (T), error identification circuit 308 determines that a burst error occurred and generates a Burst Error Signal. If the number of error pulses that occur during an Error Count Period (CP) is greater than or equal to an Error Threshold (T), error identification circuit 308 determines that a severe error, also called a long term error, occurred and generates a Long Term Error Signal.

This process of counting the number of error pulses in the Error Signals is repeated for each Error Count Period (CP) until the Checker in Sync signal is no longer asserted. When the Checker in Sync signal is not asserted, error identification circuit 308 stops counting the number of error pulses.

Figure 4:
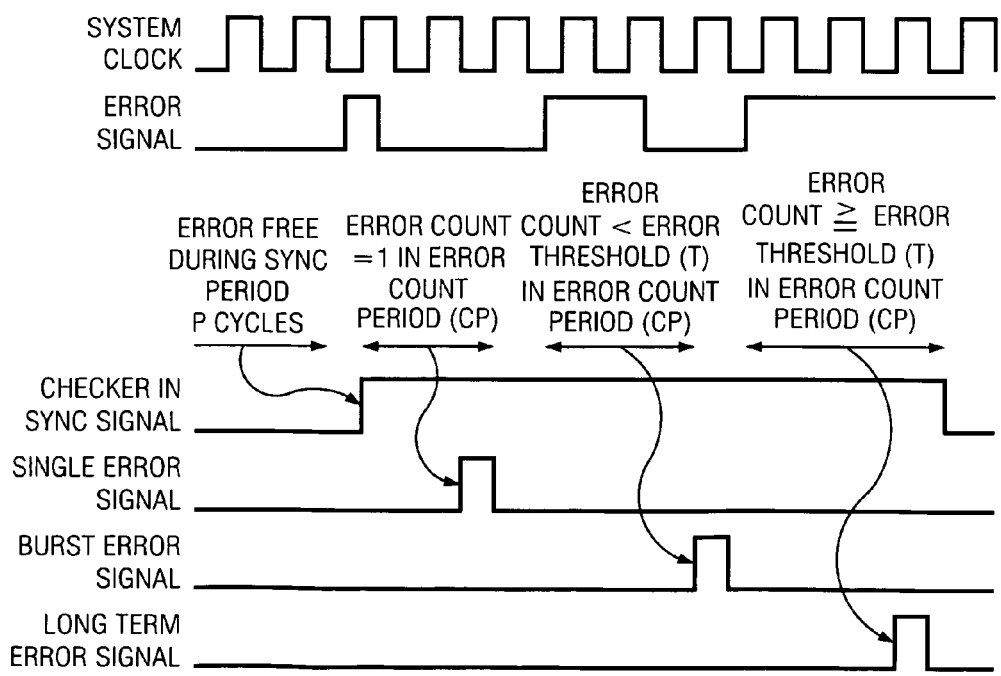
FIG. 4 is a timing diagram that depicts a system clock, an error signal that is output from a PRBS checker, and the single, burst, and long term error signals in accordance with the present invention.

FIG. 4 is a timing diagram that depicts a system clock, an Error Signal that is output from a PRBS checker, and the Single, Burst, and Long Term error signals in accordance with the present invention. As depicted, when the Error Signal is error free for the Sync Period (P) number of clock cycles, the Checker in Sync signal is asserted. After the Checker in Sync signal is asserted, the number of error occurrences is counted during an Error Count Period (CP) number of clock cycles. During the CP number of clock cycles, if the total number of error occurrences indicated by the Error Signal is equal to one, the Single Error signal includes a pulse that indicates that a single error, also called an isolated error, has occurred. During the CP number of clock cycles, if the total number of error occurrences indicated by the Error Signal is greater than one but less than an Error Threshold (T), the Burst Error signal includes a pulse that indicates that a burst error has occurred. During the CP number of clock cycles, if the total number of error occurrences indicated by the Error Signal is greater than or equal to an Error Threshold (T), the Long Term Error signal includes a pulse that indicates that a long term error has occurred.

Figure 5:
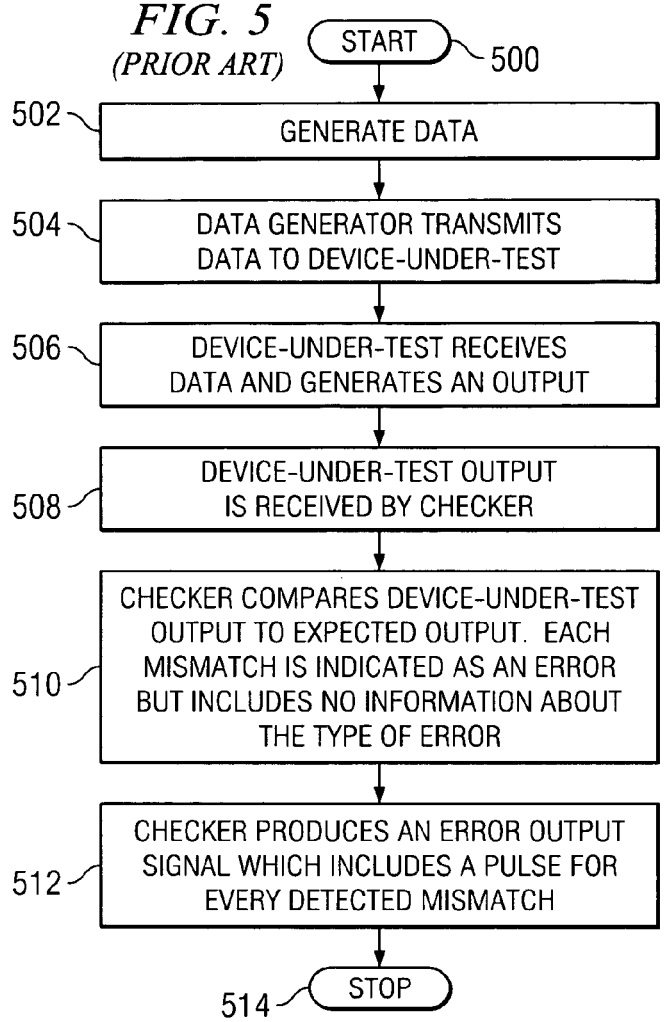
FIG. 5 depicts a high level flow chart that illustrates the detection of an occurrence of an error in a device-under-test (DUT) in accordance with the prior art.

FIG. 5 depicts a high level flow chart that illustrates the detection of an occurrence of an error in a device-under-test (DUT) in accordance with the prior art. The process starts as depicted by block 500 and thereafter passes to block 502 which illustrates generating data. Next, block 504 depicts the data generator transmitting the data to a device-under-test (DUT). Thereafter, block 506 illustrates the DUT receiving the data and generating an output.

The process then passes to block 508 which depicts the DUT output being received by a checker. Next, block 510 illustrates the checker comparing the actual DUT output to the expected output that is expected to be output by the DUT when the DUT receives the data generated by the data generator. Each mismatch between the expected output and the actual output is indicated as an error by including a pulse in an error signal that is output by the checker. This error signal includes a pulse each time a mismatch is detected. No other information is included in the signal. No information about the type of error is included in the signal. The only information that the signal includes is an indication that some type of error was present, i.e. that some type of error occurred.

Next, block 512 depicts the checker produces an error output signal that includes a pulse for every detected mismatch. The process terminates as illustrated by block 514.

Figure 6:
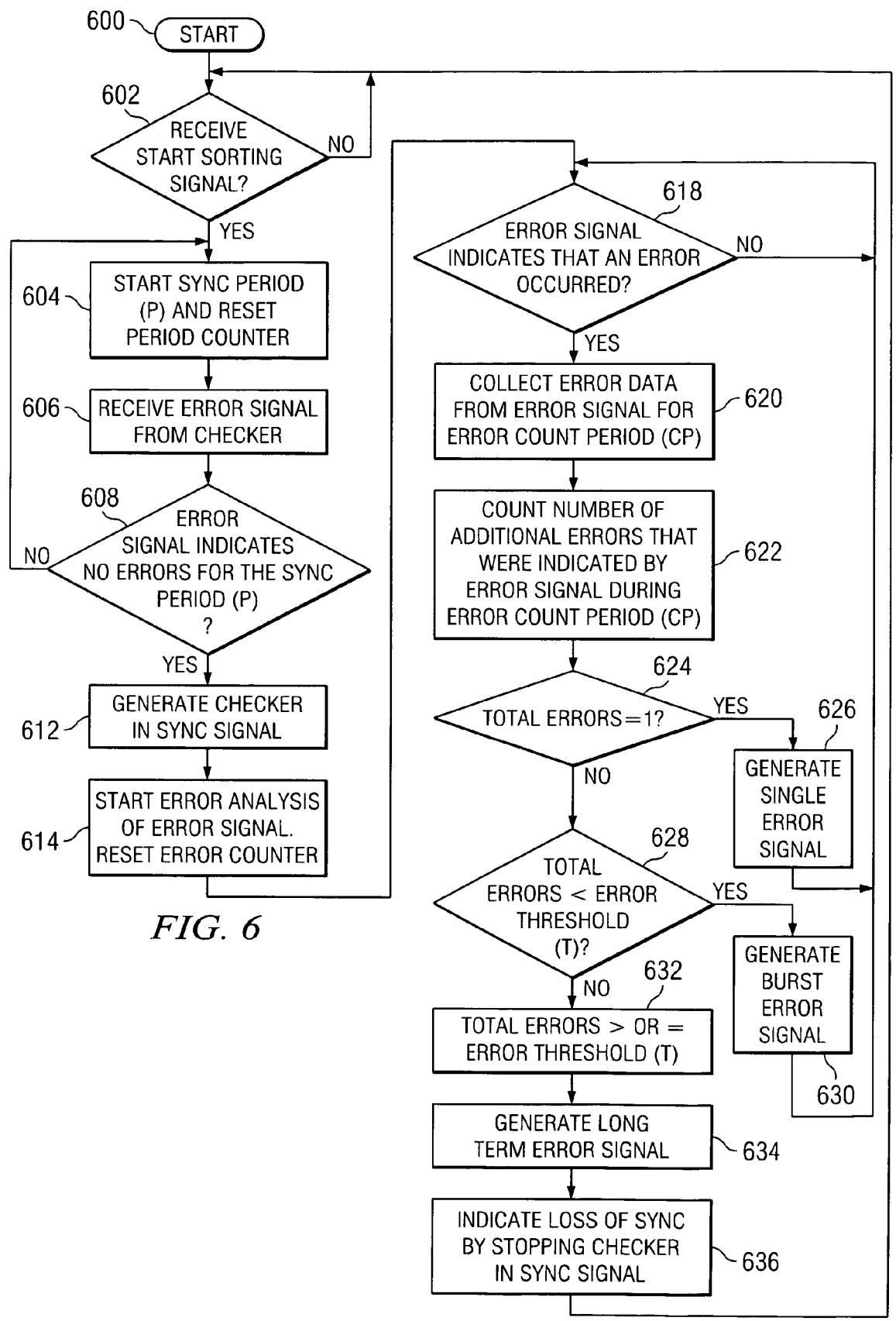
FIG. 6 illustrates a high level flow chart that depicts identifying types of errors that occur in a communications device under test and where only the presence of an error is indicated by an error checker in accordance with the present invention.

FIG. 6 illustrates a high level flow chart that depicts identifying types of errors that occur in a communications device under test and where only the presence of an error is indicated by an error checker in accordance with the present invention. The process starts as depicted by block 600 and thereafter passes to block 602 which illustrates a determination of whether or not a Start Sorting signal has been received. If a determination is made that a Start Sorting signal has not been received, the process passes back to block 602. If a determination is made that a Start Sorting signal has been received, the process passes to block 604 which depicts starting a synchronization period (Sync Period P). At this time the Period Counter is reset so that it will begin counting the number of clock periods. The process then passes to block 606 which illustrates receiving the Error Signal from the checker.

Block 608, then, depicts a determination of whether or not the Error Signal indicates that there were no errors during the Sync Period P. If a determination is made that the checker's error signal indicates that there were errors during the Sync Period P, the process passes back to block 604.

Referring again to block 608, if a determination is made that the Error Signal indicates that there were no errors during the Sync Period P, the process passes to block 612 which illustrates the checker generating the Checker in Sync signal. At this time the checker is in sync and any old data that had been stored in the checker has been purged. Next, block 614 depicts starting the error analysis of the Error Signal output from the checker. The Error Counter 312 is reset so that it will start counting the number of error pulses in the Error Signal. The process then passes to block 618 which illustrates a determination of whether or not the Error Signal indicates that an error occurred. The Error Signal indicates that an error occurred when the Error Signal includes a pulse. If a determination is made that the Error Signal does not indicate that an error occurred, the process passes back to block 618. Referring again to block 618, if a determination is made that the Error Signal did indicate that an error occurred, the process passes to block 620.

Block 620 depicts collecting error data from the Error Signal for a length of time that is equal to the Error Count Period (CP). Thereafter, block 622 illustrates counting the number of additional errors that are indicated by the Error Signal during the Error Count Period (CP).

The process then passes to block 624 which depicts a determination of whether or not the total number of errors counted during the Error Count Period equals one. If a determination is made that the total number of errors counted during the Error Count Period is equal to one, the process passes to block 626 which illustrates generating the Single Error signal. The process then passes back to block 618.

Referring again to block 624, if a determination is made that the total number of errors does not equal one, the process passes to block 628 which depicts a determination of whether or not the total number of errors counted during the Error Count Period is less than an Error Threshold (T). If a determination is made that the total number of errors counted during the Error Count Period is less than a threshold, the process passes to block 630. Block 630 illustrates generating the Burst Error Signal. The process then passes back to block 618. Referring again to block 628, if a determination is made that the total number of errors counted during the Error Count Period is not less than the Error Threshold (T), the process passes to block 632.

Block 632 depicts the total number of errors being greater than or equal to the Error Threshold (T). Next, block 634 illustrates generating the Long Term Error signal. Thereafter, block 636 depicts indicating a loss of synchronization by stopping the Checker in Sync signal. The process then passes back to block 602.

Figure 7:
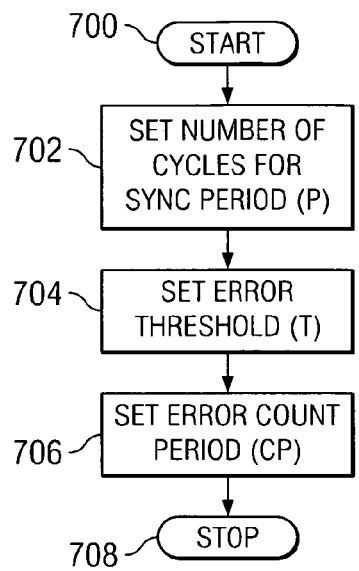
FIG. 7 depicts a high level flow chart that illustrates setting values for a synchronization period, an error threshold, and an error count period in accordance with the present invention.

FIG. 7 depicts a high level flow chart that illustrates setting values for a synchronization period, an error threshold, and an error count period in accordance with the present invention. The process starts as depicted by block 700 and thereafter passes to block 702 which illustrates setting the number of clock cycles for the Sync Period (P) equal to a particular value. Next, block 704 depicts setting the Error Threshold (T) to a particular value. Block 706, then, illustrates setting the Error Count Period (CP) equal to a particular number of clock cycles. The process then terminates as depicted by block 708.

Figure 8A:
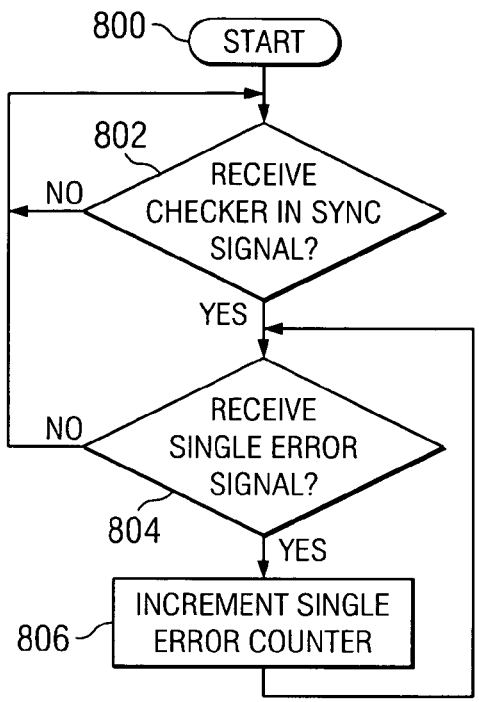
FIG. 8A illustrates a high level flow chart that depicts counting the number of single errors in accordance with the present invention.

FIG. 8A illustrates a high level flow chart that depicts counting the number of single errors in accordance with the present invention. The process starts as depicted by block 800 and thereafter passes to block 802 which illustrates a determination of whether or not the Checker in Sync signal has been received. If a determination is made that the Checker in Sync signal has not been received, the process passes back to block 802. If a determination is made that the Checker in Sync signal has been received, the process passes to block 804 which depicts a determination of whether or not the Single Error signal has been received. If a determination is made that the Signal Error signal has been received, the process passes to block 806 which illustrates incrementing the Single Error counter. The process passes back to block 804. Referring again to block 804, if a determination is made that the Single Error signal has not been received, the process passes back to block 802.

Figure 8B:
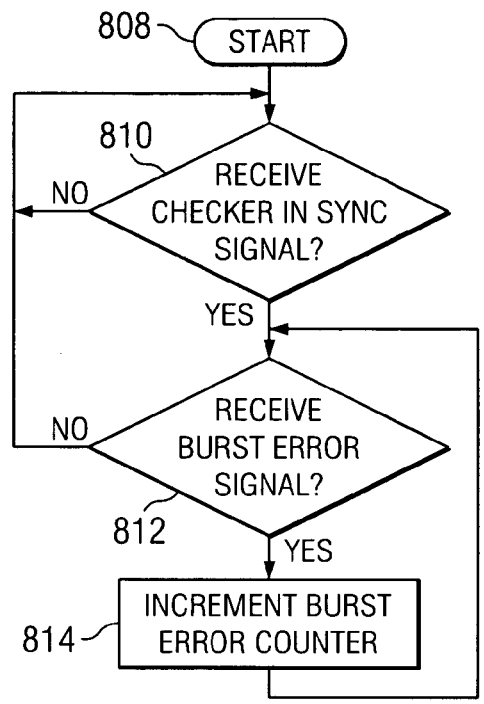
FIG. 8B depicts a high level flow chart that illustrates counting the number of burst errors in accordance with the present invention.

FIG. 8B depicts a high level flow chart that illustrates counting the number of burst errors in accordance with the present invention. The process starts as depicted by block 808 and thereafter passes to block 810 which illustrates a determination of whether or not the Checker in Sync signal has been received. If a determination is made that the Checker in Sync signal has not been received, the process passes back to block 810. If a determination is made that the Checker in Sync signal has been received, the process passes to block 812 which depicts a determination of whether or not the Burst Error signal has been received. If a determination is made that the Burst Error signal has been received, the process passes to block 814 which illustrates incrementing the Burst Error counter. The process passes back to block 812. Referring again to block 812, if a determination is made that the Burst Error signal has not been received, the process passes back to block 810.

Figure 8C:
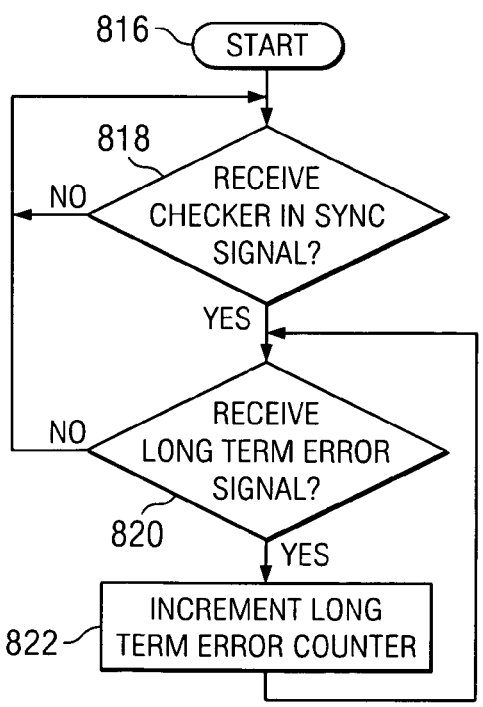
FIG. 8C illustrates a high level flow chart that depicts counting the number of long term errors in accordance with the present invention.

FIG. 8C illustrates a high level flow chart that depicts counting the number of long term errors in accordance with the present invention. The process starts as depicted by block 816 and thereafter passes to block 818 which illustrates a determination of whether or not the Checker in Sync signal has been received. If a determination is made that the Checker in Sync signal has not been received, the process passes back to block 818. If a determination is made that the Checker in Sync signal has been received, the process passes to block 820 which depicts a determination of whether or not the Long Term Error signal has been received. If a determination is made that the Long Term Error signal has been received, the process passes to block 822 which illustrates incrementing the Long Term Error counter. The process passes back to block 820. Referring again to block 820, if a determination is made that the Long Term Error signal has not been received, the process passes back to block 818.

Figure 9:
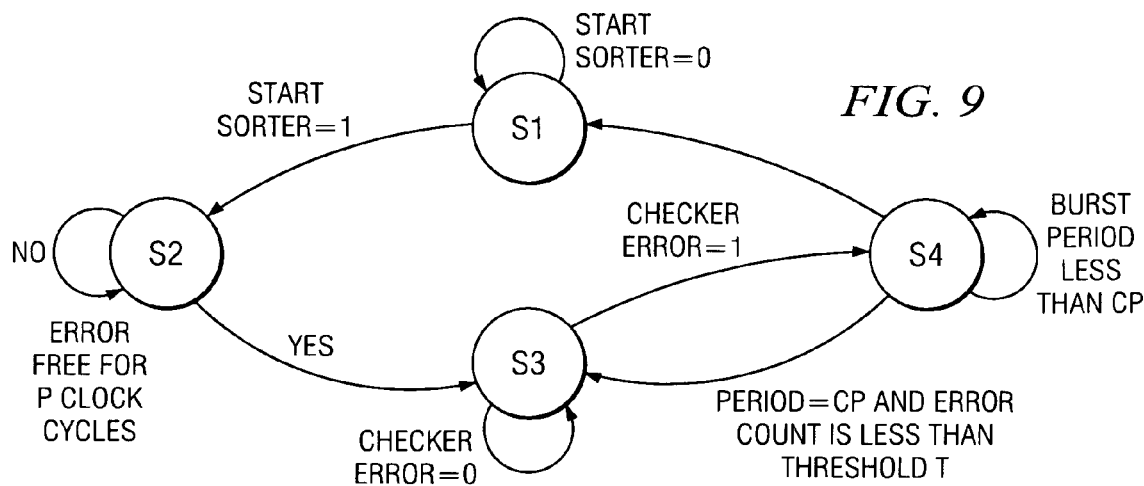
FIG. 9 depicts a state machine of the present invention in accordance with the present invention.

FIG. 9 depicts a state machine of the present invention in accordance with the present invention. The state machine starts in state S1 and remains there until a Start Sorter signal is activated. It then transitions to state S2 after the Start Sorter signal becomes active. The state machine stays in state S2 until it finds an error free region that is P cycles long. This is the initial synchronization period. When it is detected that P cycles have passed with no errors, it transitions to state S3. In this state, the machine continues to look for errors and stays in this state until an error is found.

The state machine transitions to state S4 on encountering an error. In state S4, the machine counts errors occurring during a programmable time window "CP". This length of time "CP" is provided by a user. The state machine stays in state S4 for time period CP. At the end of time period CP, it compares the error count with a threshold T. This threshold is programmable and is provided by a user. The machine transitions to state S3 if the error count is less than threshold T. It transitions to state S1 if the error count in state S4 exceeds threshold T.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for identifying types of errors that occur in a communications device under test and that are indicated by an error checker, said method comprising:

during each one of a plurality of contiguous time periods:
identifying each presence of an error bit in an error signal output from said error data checker, said error bit indicating only that a mismatch occurred between an input signal input into said device and an output signal output from said device, said error bit being generated in response to an error in said device, said error bit including no information about a type of said error; and determining said type of said error by determining a number of occurrences of said error bit during said one of said plurality of contiguous time periods;

each one of said plurality of contiguous time periods being equal to a particular number of clock cycles of a system clock;

in response to determining that said number of occurrences is only one occurrence of said error bit, determining that said type of said error is an isolated type of error;

in response to determining that said number of occurrences of said error bit is greater than one but less than a threshold, determining that said type of said error is a burst type of error;

in response to determining that said number of occurrences of said error bit is greater than or equal to said threshold, determining that said type of said error is a long term type of error;

receiving said error signal output within an error identification circuit;

counting, by a first counter in said error identification circuit, each occurrence of said error bit during said one of said plurality of contiguous time periods;

counting, by a second counter in said error identification circuit, a number of elapsed clock cycles that have elapsed since a start of a last one of said plurality of contiguous time periods; and;

in response to said number of elapsed clock cycles being equal to said particular number of clock cycles, identifying a start of a next one of said plurality of contiguous time periods.

2. The method according to claim 1, further comprising:
in response to determining that said number of occurrences is a first number, determining that said type of said error is a first type of error;
in response to determining that said number of occurrences is a second number, determining that said type of said error is a second type of error; and
in response to determining that said number of occurrences is a third number, determining that said type of said error is a third type of error.

3. The method according to claim 1, further comprising:
receiving a start sorting signal in said error identification circuit that causes said error identification circuit to start counting each occurrence of said error bit.

4. The method according to claim 1, further comprising:
receiving, within said error identification circuit, said threshold, said threshold being a user programmable threshold; and
determining said type of said error, by said error identification circuit, by determining a number of occurrences of said error bit during said one of said plurality of contiguous time periods and by utilizing said threshold.

5. The method according to claim 1, further comprising:
receiving, within said error identification circuit, a second number of clock cycles of said system clock;
identifying, by said error identification circuit, an end of a synchronization period, said end of said synchronization period being when no occurrences of said error bit were detected by said error identification circuit during said second number of clock cycles;
a first one of said plurality of contiguous time periods beginning immediately after said end of said synchronization period; and
beginning to determine said type of said error, by said error identification circuit, in response to said error identification circuit identifying said end of said synchronization period.

6. The method according to claim 1, further comprising:
receiving within said device a pseudorandom bit sequence (PRBS) input signal;
outputting from said device an output PRBS signal;
determining, by a PRBS data checker, whether a mismatch occurred between said input signal and said output signal; and in response to determining that a mismatch did occur, said PRBS data checker outputting said error signal that includes said error bit.

7. The method according to claim 1, wherein the device is one of a communication channel and a communication circuit.

8. An apparatus within a data processing system for identifying types of errors that occur in a communications device under test and that are indicated by an error checker, said apparatus comprising:

a plurality of contiguous time periods, each one of said plurality of contiguous time periods being equal to a particular number of clock cycles of a system clock;

an error identification circuit; and during each one of said plurality of contiguous time periods:

said error identification circuit identifying, each presence of an error bit in an error signal output from said error data checker, said error bit indicating only that a mismatch occurred between an input signal input into said device and an output signal output from said device, said error bit being generated in response to an error in said device, said error bit including no information about a type of said error;

said error identification circuit determining said type of said error by determining a number of occurrences of said error bit during said one of said plurality of contiguous time periods;

in response to determining that said number of occurrences is only one occurrence of said error bit, said error identification circuit determining that said type of said error is an isolated type of error;

in response to determining that said number of occurrences of said error bit is greater than one but less than a threshold, said error identification circuit determining that said type of said error is a burst type of error;

in response to determining that said number of occurrences of said error bit is greater than or equal to said threshold, said error identification circuit determining that said type of said error is a long term type of error;

said error identification circuit receiving said error signal output;

a first counter in said error identification circuit for counting each occurrence of said error bit during said one of said plurality of contiguous time periods;

a second counter in said error identification circuit for counting a number of elapsed clock cycles that have elapsed since a start of a last one of said plurality of contiguous time periods; and in response to said number of elapsed clock cycles being equal to said particular number of clock cycles, said error identification circuit identifying a start of a next one of said plurality of contiguous time periods.

9. The apparatus according to claim 8, further comprising:

in response to determining that said number of occurrences is a first number, said error identification circuit determining that said type of said error is a first type of error;

in response to determining that said number of occurrences is a second number, said error identification circuit determining that said type of said error is a second type of error; and in response to determining that said number of occurrences is a third number, said error identification circuit determining that said type of said error is a third type of error.

10. The apparatus according to claim 8, further comprising:

a start sorting signal received within said error identification circuit that causes said error identification circuit to start counting each occurrence of said error bit.

11. The apparatus according to claim 8, further comprising:

said threshold received within said error identification circuit, said threshold being a user programmable threshold; and said error identification circuit for determining said type of said error by determining a number of occurrences of said error bit during said one of said plurality of contiguous time periods and by utilizing said threshold.

12. The apparatus according to claim 8, further comprising:

a second number of clock cycles of said system clock received within said error identification circuit;

said error identification circuit identifying an end of a synchronization period, said end of said synchronization period being when no occurrences of said error bit were detected by said error identification circuit during said second number of clock cycles;

a first one of said plurality of contiguous time periods beginning immediately after said end of said synchronization period; and said error identification circuit beginning to determine said type of said error in response to said error identification circuit identifying said end of said synchronization period.

13. The apparatus according to claim 8, further comprising:

a pseudorandom bit sequence (PRBS) input signal received within said device;

an output PRBS signal output from said device;

a PRBS data checker determining whether a mismatch occurred between said input signal and said output signal; and in response to determining that a mismatch did occur, said PRBS data checker outputting said error signal that includes said error bit.

14. The apparatus according to claim 8, wherein the device is one of a communication channel and a communication circuit.

* * * * *